United States Patent
Aslanidis et al.

(10) Patent No.: US 7,905,418 B2
(45) Date of Patent: Mar. 15, 2011

(54) RFID TAG

(75) Inventors: Konstantin Aslanidis, Dachau (DE); Helfried Vollbrecht, Moosburg (DE); Juergen Mayer, Allershausen (DE)

(73) Assignee: Texas Instruments Deutschland GmbH, Freising (DE)

(*) Notice: Subject to any disclaimer, the term of this patent is extended or adjusted under 35 U.S.C. 154(b) by 0 days.

(21) Appl. No.: 12/397,951

(22) Filed: Mar. 4, 2009

(65) Prior Publication Data
US 2009/0224059 A1 Sep. 10, 2009

Related U.S. Application Data

(60) Provisional application No. 61/141,862, filed on Dec. 31, 2008.

(30) Foreign Application Priority Data

Mar. 5, 2008 (DE) .......................... 10 2008 012 632

(51) Int. Cl.
*G06K 19/00* (2006.01)
*G06K 19/06* (2006.01)

(52) U.S. Cl. ......................................... 235/487; 235/492
(58) Field of Classification Search .................. 235/487, 235/492
See application file for complete search history.

(56) References Cited

U.S. PATENT DOCUMENTS

2003/0179151 A1* 9/2003 Senba et al. .................. 343/895

FOREIGN PATENT DOCUMENTS

| DE | 10 2005 062 414 | | 6/2007 |
| GB | 2 420 291 | | 5/2006 |
| GB | 2420291 | * | 5/2006 |

* cited by examiner

*Primary Examiner* — Michael G Lee
*Assistant Examiner* — Laura Gudorf
(74) *Attorney, Agent, or Firm* — William B. Kempler; Wade J. Brady, III; Frederick J. Telecky, Jr.

(57) ABSTRACT

An RFID tag is provided, which has a transponder part with an antenna coil arranged in the transponder part. A mounting part is also provided for fixing the tag in a mounted position. The mounting part has an elongate portion that is engagable with the transponder part so as to be received in the transponder part when the tag is in the mounted position. Further, the tag comprises a magnetic material arranged in the elongate portion of the mounting part.

12 Claims, 3 Drawing Sheets

RFID TAG

This patent application claims priority from German Patent Application No. 10 2008 012 632.2, filed 5 Mar. 2008 and from U.S. Provisional Patent Application No. 61/141,862, filed 31 Dec. 2008, the entireties of which are incorporated herein by reference.

FIELD OF THE INVENTION

The present invention generally relates to an RFID tag. More particularly, the present invention relates to a mountable RFID tag for identification purposes, security applications and animal tagging.

BACKGROUND OF THE INVENTION

Passive RFID antennas implemented as HDX and FDX ear tags are widely used for the tracking and identification of animals. The antennas are provided in plastic RFID tags, with the antenna (transponder) coil and required electronics being molded into a plastic button that is attached to the animal's ear. The ear tag consists of two parts, with one being the encapsulated transponder coil and electronics and the other containing a mounting needle embedded in plastic that pierces the animal's ear and attaches to the part containing the transponder coil and electronics so as to fix it on the ear and ensure that the ear tag cannot be removed without destroying it. When gathering information from the RFID tags attached to an animal's ear, it is often required to hold the read/write (R/W) unit a relatively large distance from the animal, which requires an antenna with increased performance in order to increase the voltage at the antenna terminals so that the antenna can transmit and receive RF signals over a (relatively large) distances. One way of improving the performance of an RFID antenna is to increase the quality factor Q of the antenna. This can be done by using litz wire to form the antenna coil, which leads to an improved performance of the RFID tag, but is rather expensive.

Another conventional solution to increase Q involves placing a ferrite material e.g. a ferrite stick within the coil. The ferrite may be provided as a stick inside the mounting needle. Using ferrite in the RFID tags as described above significantly improves the Q of the antenna coils contained therein. However, the ferrite is exposed to mechanical stress, while fixing the ear tag and tends to break due to its rigidity. Furthermore, the increase of Q is limited due to the ferrite's stick-like shape.

SUMMARY OF THE INVENTION

Accordingly, an aspect of the present invention provides an RFID tag. The RFID tag, comprises a transponder part having an antenna coil with, during operation, an associated field forming a closed loop arranged therein, and a mounting part for fixing the tag in a mounted position and being engageable with the transponder part so as to be received in the transponder part when the tag is in the mounted position. Furthermore, the tag also comprises an amorphous ferromagnetic material configured to be arranged proximal to the antenna coil when the tag is in the mounted position for guiding the field over a section of the closed loop. A transponder part of the tag houses an antenna coil, which is used as an RF transponder and is mounted to an item that it is wished to identify, for example an animal or any other item, by piercing the item with the mounting part and then coupling or engaging the mounting part to the transponder part, which fixes the tag in its mounted position. This can be achieved, for example, by providing an engagement portion in the transponder part that defines a recess for receiving the mounting part to create a tension fit between the mounting part and the transponder part so that the tag is held securely in place and can only be removed from its mounted position by destroying it. An amorphous ferromagnetic material is then arranged in the tag so that it is positioned relative to the antenna coil in order to guide the magnetic field associated with the antenna coil over a section of a closed loop over which the field extends (the predetermined magnetic field pattern of the coil). It is an inherent characteristic of the magnetic field of a coil to form a closed loop. By "section" of the closed loop, it is meant that the field is guided by the amorphous material over only a part of the closed loop. The remainder of the closed loop is free of amorphous material, thereby allowing the field to be captured in this part of the closed loop for reading and writing purposes. In this way, the quality of the antenna is increased, which extends the performance of the transponder, and can be implemented by adapting existing RFID tag designs. This means that the performance of the RFID tag is increased relative to existing RFID tags, without increasing the cost of manufacturing the tag. Proximal to the antenna means that the amorphous material (e.g. a piece of the material) is arranged very close to the antenna coil, i.e. e.g. within millimeters or centimeters from the antenna coil dependent on the dimensions of the RFID tag.

In one aspect, the amorphous ferromagnetic material is adapted to guide the field from a first direction to a second direction. The field associated with the antenna coil extends along a line parallel to that defined by a longitudinal axis of the coil. After the field lines leave one end of the coil, they extend through the air along the same central longitudinal axis and then eventually they curve around in a loop and enter the other end of the coil along its central longitudinal axis. Depending on the properties of the coil, this loop may have a small diameter; i.e., extend over only a relatively short distance, or have a large diameter and extend over a long distance, in which case the field lines associated with the coil will appear to extend through the air along or parallel to the central longitudinal axis of the coil in a straight line. The amorphous material can then be arranged relative to the antenna coil such that it causes the field lines to bend around from a first direction to a second direction. The first direction may be a predetermined field direction. This predetermined field direction is the direction in which the field lines associated with the coil would extend in an undisturbed state without external influence. This aspect of the invention provides that the quality of the arrangement (LC, tank) can be further increased.

The amorphous material may have an angular shape. In particular, the amorphous material may be shaped so as to be generally triangular. The shape of the amorphous material is configured to be angular, which means that it will have at least one corner. In this configuration, the amorphous material advantageously directs the field associated with the coil so that the quality of the antenna coil is maximized.

Furthermore, the amorphous material can be configured so as to define a gap through which the field extends over a section of the closed loop. The amorphous material can be shaped such that recesses or gaps are provided in it. The field is then guided by the amorphous material into the gap and then it can extend through the gap. In other words, a section of the closed loop field pattern associated with the antenna coil extends through the gap. In this configuration, it is easier for a read/write unit, for example, to get close to the magnetic field and extract information from the RFID tag or to write information to the RFID tag. Furthermore, it is easier to transfer enough energy through the magnetic field to the RFID tag.

The amorphous material can also be arranged so as to be outside the coil. In other words, the amorphous material is arranged so that none of it extends through the centre or interior of the coil when the tag is in the mounted position (the transponder part and the mounting part are engaged with each other) or the unmounted position (the transponder part and the mounting part are not engaged with each other). These aspects of the invention improve robustness of the RFID tag.

The amorphous material can also be arranged so as to be inside the coil when the tag is in the mounted position. In other words, the amorphous material can be arranged such that it extends through the interior or center of the antenna coil.

In one aspect of the invention, the amorphous material is arranged in the transponder part. The amorphous material can be provided inside the transponder part of the tag so that it is always in proximity to the antenna coil, whether or not the transponder part and the mounting part are engaged with each other.

Advantageously, the amorphous material is arranged in two separate sections. The two sections can be arranged in the transponder part so as to coincide with the plane of the transponder part and there can be a gap between them through which the field associated with the coil can extend. One section can be generally triangular and the other can be generally rectangular. The antenna coil may then be arranged to extend between the two sections so that at least part of the coil extends through the gap between the two separate sections. Each of the two sections may comprise a recess that is adapted to receive the antenna coil. Each end of the antenna coil may be received in a recess so that the ends of the antenna coil form a tension fit with the parts of the amorphous material defining the recesses, and thus the antenna coil is fixed in place by the amorphous material.

Instead of a mere antenna coil a conventional glass transponder may be used. The conventional glass transponder can include the necessary electronics, a ferrite stick and a coil. The amorphous material may then be arranged around the conventional transponder in accordance with the aspects of the present invention. In this configuration, the amorphous material serves to improve the quality factor of the antenna of the conventional glass transponder. Moreover, the magnetic fields of the conventional transponder can be guided away from the glass transponder thereby improving substantially the read and write performance of the conventional glass transponder. Using a glass transponder is extremely economical and allows the RFID tag of the present invention to be easily adapted from existing tag designs. Therefore, the present invention relates also to a method of customizing conventional transponders, in particular glass transponders. Accordingly, a conventional transponder including e.g. a ferrite stick, is supplemented by a piece of amorphous material, which is arranged around the transponder for guiding the filed lines along a limited distance for increasing the quality factor of the transponder. Furthermore, the piece of amorphous material is arranged such that the filed extends sufficiently outside the amorphous material so as to improve accessibility of the transponder.

In another aspect of the invention, the amorphous material is arranged in the mounting part. This means that the amorphous material is only proximal to the antenna coil when the transponder part and the mounting part are in engagement with each other.

In a further aspect of the invention, the mounting part may comprise a needle having a tip provided at an end that is received in the transponder part in the mounted position and the tip is formed of the amorphous material. An elongate needle may be attached at one end to a base of the mounting part. The other end of the needle, which is to be coupled to the transponder part, can be sharpened to a point or tip so that it can be used as a needle for piercing the ear of an animal to be tagged, for example. Then just the tip of the needle can be formed of the amorphous ferromagnetic material, whereas the rest of the needle may be formed from a non-magnetic material. Forming only the tip of the needle from the amorphous material substantially increases the quality Q of the antenna coil when the needle is received inside the transponder part of the tag in its mounted position.

The amorphous material may also be provided in the mounting part such that it extends in both the first and second directions. In this embodiment, the tip of the needle is not formed of the amorphous material, but instead from the material used to form the rest of the mounting part (for example a molded plastic). The amorphous material is then arranged to extend along a central longitudinal axis of the needle inside the needle. At the junction between the base of the mounting part and the needle, the amorphous material is split into two sections, each of which is bent over so that both sections are arranged inside the base of the mounting part approximately at right angles to the section of amorphous material provided in the needle of the mounting part. This means that, when the tag is in its mounted position, the magnetic field associated with the antenna coil is first guided along the central longitudinal axis of the needle and then perpendicular to this direction through the base of the mounting part.

Advantageously, the amorphous material has a relative magnetic permeability of between 2000 and 115000. Using a material with such a high relative magnetic permeability substantially increases Q and thus the voltage at the terminals of the antenna.

Advantageously, the transponder part may be configured as a label for the tag. When tagging animals, or items for security monitoring, a label may be provided on the tag on which an identification number may be written, for example. This label may be used as the transponder part of the tag for housing the antenna coil. The label may be shaped so as to be generally triangular, for example. Using the label as the transponder part provides the advantage that it is easily accessible to a read/write unit for obtaining information from the tag, since the label must anyway be configured to be easily accessible for reading identification markings provided thereon.

The label can preferably be used for embedding a conventional glass transponder in combination with the amorphous material. The conventional glass transponder may then be positioned in the middle of a triangularly shaped transponder part and two compact pieces of amorphous material, which are located basically on both ends of the conventional glass transponder. Furthermore, the amorphous material, i.e. the two compact pieces of amorphous material, may provide a small recess in which a respectively end portion of the elongate conventional glass transponder can protrude. This aspect of the invention allows a robust, but cheap ear tag with an RFID transponder to be implemented having an increased read and write performance compared with the sole conventional glass transponder.

The present invention also provides an RFID system including a read/write unit and an RFID tag. The RFID tag comprises a transponder part having an antenna coil with an associated field forming a closed loop arranged therein, and a mounting part for fixing the tag in a mounted position and being engageable with the transponder part so as to be received in the transponder part when the tag is in the mounted position. Further, the tag comprises an amorphous ferromagnetic material configured to be arranged proximal to the antenna coil when the tag is in the mounted position for guiding the field over a section of the closed loop.

The present invention also provides a method of manufacturing an RFID tag. The method comprises positioning an antenna coil in a transponder part, the antenna coil having an associated field forming a closed loop, forming a mounting part for engagement with the transponder part in a mounted position, and providing an amorphous ferromagnetic magnetic material in the tag such that the amorphous material is arranged proximal to the antenna coil when the tag is in the mounted position for guiding the field over a section of the closed loop.

BRIEF DESCRIPTION OF THE DRAWINGS

Further advantages and characteristics of the invention ensue from the description below of the preferred embodiments, and from the accompanying drawings, in which.

DETAILED DESCRIPTION OF EXAMPLE EMBODIMENTS

Figure 1A:
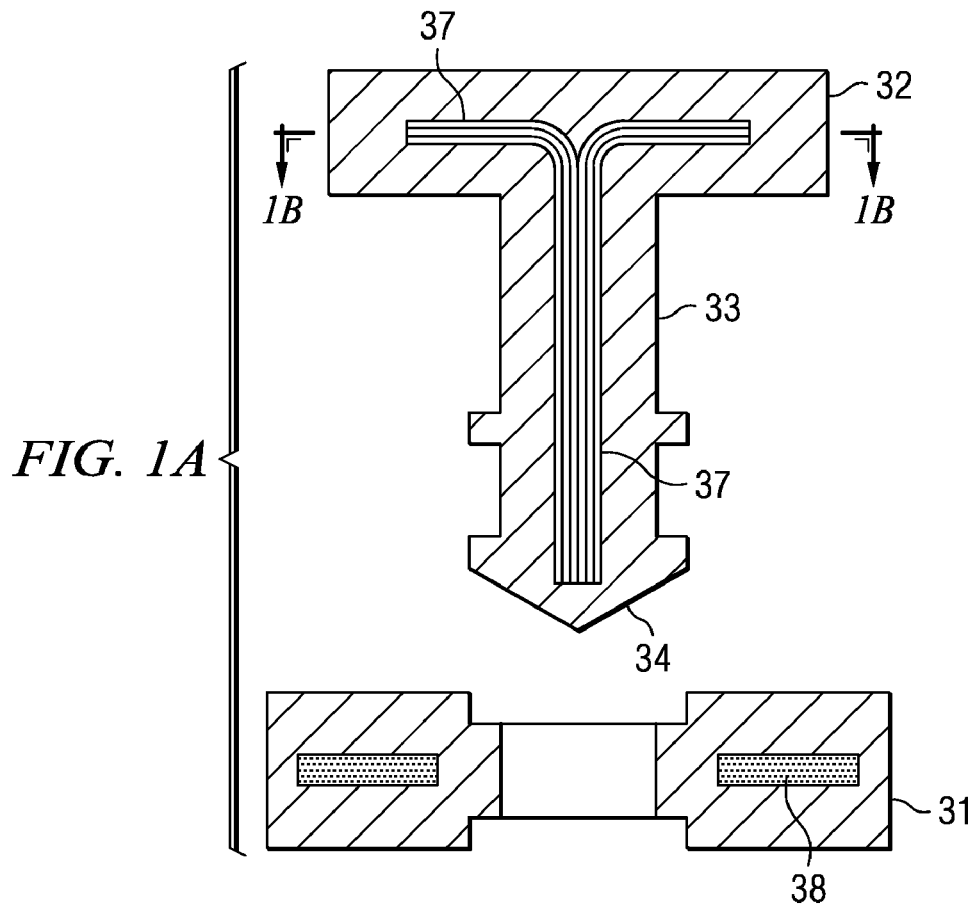
FIG. 1A is a simplified schematic cross-section of an RFID tag according to a first embodiment of the invention.
Figure 1B:
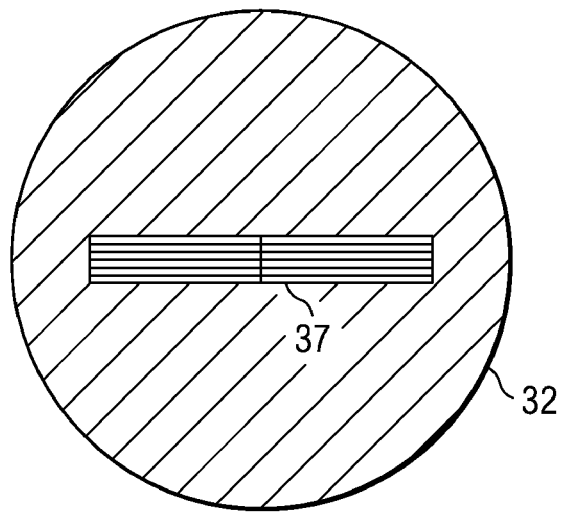
FIG. 1B is a schematic cross-sectional view of a base portion of a mounting part for an RFID tag according to a first embodiment of the invention.

FIGS. 1A and 1B show a first embodiment of the invention. The RFID tag according to the first embodiment has a generally disk-shaped transponder part 31 in which an antenna coil 38 is provided and a mounting part 32. The transponder part 31 may be formed of a molded plastic in which the antenna coil 38 is encapsulated. The mounting part 32 has a plastic disc-shaped base with a needle 33 attached to the centre of the base and extending outwardly of the base generally perpendicular to the plane of the base. The needle 33 is provided with a tip 34 sharpened to a point at the end distal from the base. When the RFID tag is in its mounted position, the needle 33 is adapted to be received in a recess defined in the centre of the transponder part 31 so that the mounting part 32 and the transponder part 31 can form a tension fit with each other. The antenna coil 38 is wound around the recess defined in the transponder part 31. An amorphous ferromagnetic material 37 is provided as a thin strip inside the needle 33 of the mounting part 32, extending from just below the tip 34 of the needle 33 into the base of the mounting part 32. At the point of the mounting part 32 where the needle 33 intersects the base, the strip of amorphous material 37 curves from the needle 33 into the base of the mounting part 32 so that it also extends into the base of the mounting part 32. In other words, the amorphous material 37 extends in a first direction generally along the central axis of the needle 33 and in a second direction generally perpendicular to the central axis of the needle 33 through the base of the mounting part 32. This is shown in FIG. 1B, which is a cross-section of the base of the mounting part 32 as viewed from above. The amorphous ferromagnetic material 37 extends across a lateral axis of the generally disk-shaped base.

The tag is fixed to an animal's ear, for example, by using the tip 34 of the needle to pierce the animal's ear and then pushing the needle 33 of the mounting part 32, and thus the tip 34, into the recess defined in the transponder part 31 to form a tension fit between the mounting part 32 and the transponder part 31. This means that the needle 33 is positioned substantially in the centre of the antenna coil 38 when the tag is in its mounted position. In this way, magnetic field from the antenna coil 38 is guided over a section of the closed loop of the field of coil 38 by the amorphous material 37, first along the central longitudinal axis of the needle 33, which is coincident with the central longitudinal axis of the coil 38 when the tag is in the mounted position. The field is then guided in a direction perpendicular to the central longitudinal axis of the coil 38 when it reaches the base of the mounting part 32, since the amorphous material 37 is arranged in this direction.

The voltage Ueff at the terminals of the antenna coil 38 is then given as follows $$U_{eff} = 2 \pi f_0 Q N A \mu_0 \mu_r H_m \quad (1),$$

where $f_0$ is the frequency of the RF signal received at the antenna coil, Q is the quality factor of the antenna coil, N is the number of turns of the coil, A is the cross-sectional area of the coil, $\mu_0$ is the permeability of free space, $\mu_r$ is the relative magnetic permeability of the material within the antenna coil, and $H_m$ is the field strength. Therefore, providing a material with a high relative magnetic permeability $\mu_r > 1$, such as the amorphous material arranged in the mounting part 32 will increase the voltage at the antenna terminals. Due to an increased magnetic permeability $\mu_r$, it may also be possible to reduce the number of turns N of the coil forming the antenna, thereby positively influencing the quality Q due to the reduced resistance of the coil, as well as the cost of the coil. Providing the ferromagnetic material with $\mu_r > 1$ in the needle 33 that sits inside the antenna coil 38 only when the RFID tag is in its mounted position means that the invention can be applied to existing designs of RFID tags, which simplifies manufacture and substantially reduces the cost of producing the tags.

The amorphous ferromagnetic material used in the RFID tags according to the invention can either be cobalt based or iron based. It is made by introducing the molten metal through a nozzle onto a water-cooled casting wheel, on which it is very rapidly quenched at about 1 million ° C. per second. A flat sheet of the material is formed, which is then wound up onto a roll and can be cut and shaped as required. The resultant amorphous ferromagnetic material then preferably has a relative magnetic permeability $\mu_r$ of between 2000 and 115000.

Figure 2:
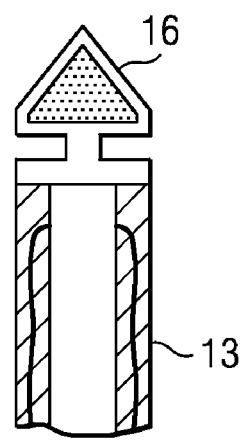
FIG. 2 is a simplified schematic cross-section of a mounting part of an RFID tag according to a second embodiment of the invention.

A second embodiment of the invention is shown in FIG. 2, which shows the needle 13 of the mounting part 12 of the tag 10. The needle 13 of the mounting part 12 is provided with a tip 16 at one end distal from the base of the mounting part 12, with the tip 16 being sharpened to a point. The entire tip 16 is formed from the amorphous ferromagnetic material having a magnetic permeability greater than 1 ($\mu_r > 1$). The rest of the needle 13 is formed of the non-magnetic material (e.g. plastic) used to form the mounting part 12 and the transponder part 11 of the RFID tag 10. The amorphous material forming the tip 16 then guides the field associated with the antenna coil to deviate at least a little bit from its predetermined field direction. Instead of following a path extending along the central longitudinal axis of the coil, and therefore the centre of the needle, the field tends to follow the direction of the apexes of the tip 16 and is guided into the air, through which it then extends to close the loop through the air. This enables a read/write unit to extract information from a greater distance due to increased Q and a (shaped) guided field.

Figure 3:
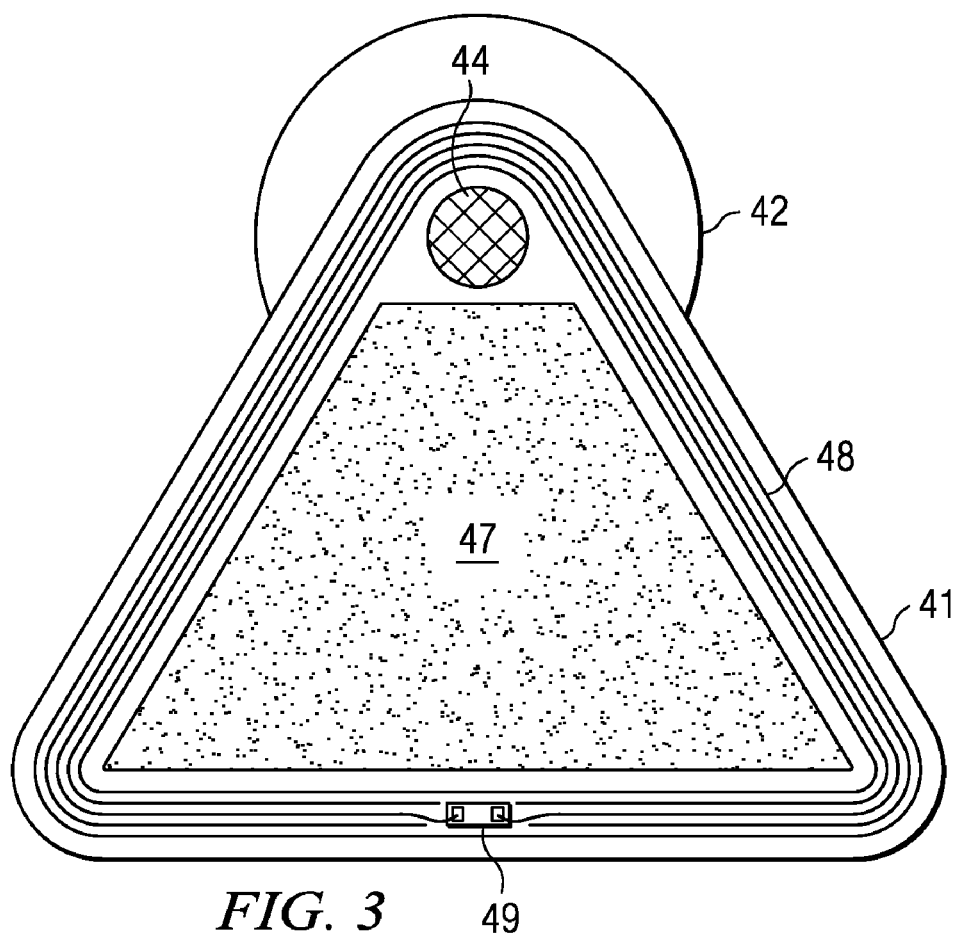
FIG. 3 is a simplified schematic cross-section of a transponder part of an RFID tag according to a third embodiment of the invention.
Figure 4:
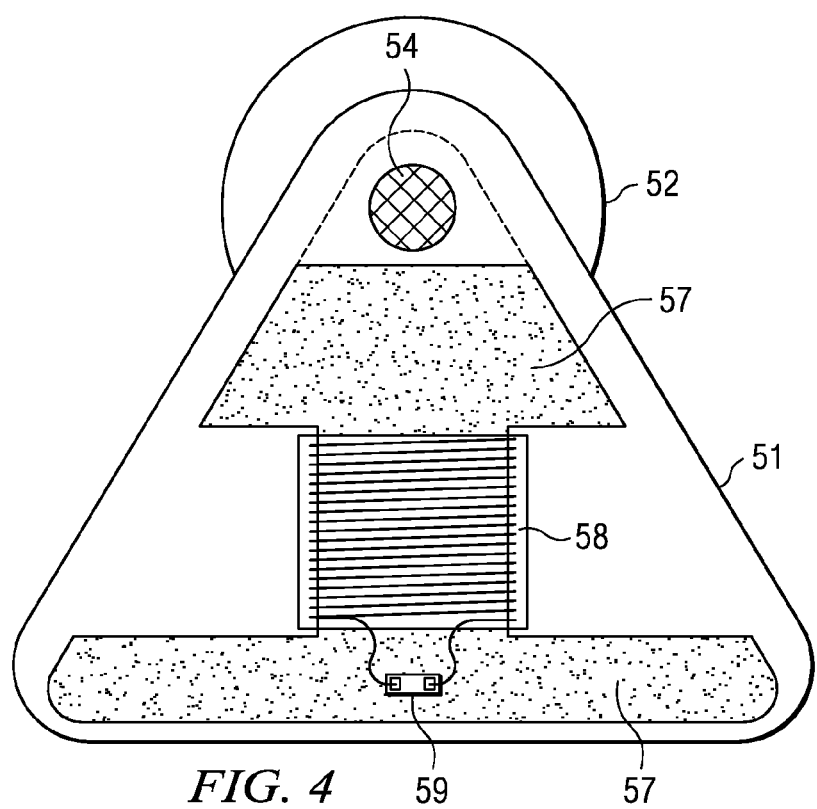
FIG. 4 is a simplified schematic cross-section of a transponder part of an RFID tag according to a fourth embodiment of the invention.
Figure 5:
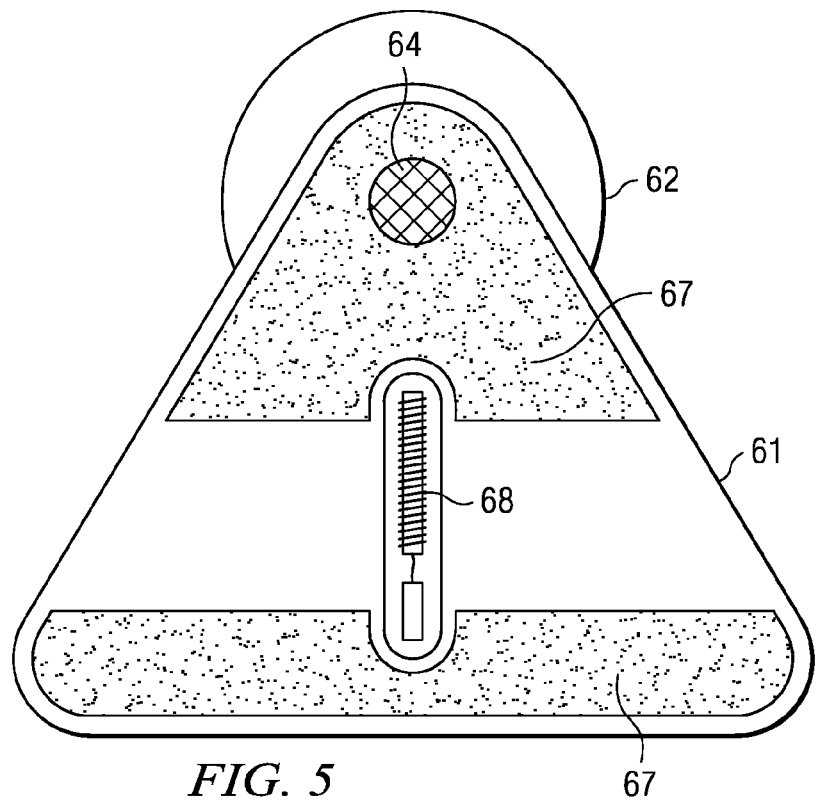
FIG. 5 is a simplified schematic cross-section of a transponder part of an RFID tag according to a fifth embodiment of the invention.

FIGS. 3 to 5 show embodiments of the invention in which an alternative configuration for the transponder part is used. In these embodiments, the transponder part is formed inside a label on the tag that is usually used, for example, for writing an identification number thereon. The labels, i.e. the transponder parts, in these embodiments of the invention are generally triangular and planar.

FIG. 3 shows a third embodiment of the invention in which an antenna coil 48 is provided generally at the edges of the label used as the transponder part 41. The antenna coil 48 is then wound in a generally triangular shape in a plane with the transponder part 41 (label). Both ends of the antenna coil 48 form terminals that a connected to a system in package module 49, which houses the RFID electronics for data storage in, and data acquisition from, the tag. The amorphous material 47 is provided in the centre of the antenna coil and is also formed in a generally flat triangular shape. However, at one corner of the triangular transponder part 41 a recess is defined, which is operable to receive the tip 44 of the needle of the mounting part 42 when the tag is in its mounted position. The central longitudinal axis of the coil 48, and thus the predetermined field direction is then perpendicular to a plane of the transponder part 41. However, the amorphous ferromagnetic material 47 also extends in a plane perpendicular to the central axis of the coil 48. Therefore the magnetic field associated with the coil 48 is guided out of one side of the transponder part 41 perpendicular to this direction in the same plane as the transponder part 41 and extends through the air over a closed loop, which eventually enters the transponder part 41 again on the opposite side.

FIG. 4 shows a fourth embodiment of the invention in which amorphous ferromagnetic material 57 is also arranged in the transponder part 51 so as to be in the same plane as the transponder part 51. However, the generally triangular planar sheet of amorphous material 57 has cutouts on both sides so that the material 57 is effectively in two larger sections joined by a smaller section which extends through the centre of the antenna coil 58. This configuration is easier to manufacture than the previous embodiment, since the coil 58 is wound onto the core of amorphous material, rather than being would around the edges of the transponder part 51. The terminals of the antenna coil are connected to a system in package module 59, which contains the RFID electronics. Again, a recess is defined in the top corner of the triangular transponder part 51 for receiving the needle 54 of the mounting part 52 when the tag is in its mounted position. In this embodiment, the amorphous ferromagnetic material 57 guides the field associated with the coil 58 through the air gaps between the two larger sections of amorphous material 57.

FIG. 5 shows another embodiment of the invention, which has a similar configuration to that shown in FIG. 4. The difference is that in this embodiment the antenna coil 68 is provided in a glass transponder arranged between the two larger sections of amorphous material 67. As well as the antenna coil 68, the glass transponder also houses the RFID electronics required for the tag. In this embodiment, there is no thinner section of amorphous material bridging the two larger sections of amorphous material 67. Instead, two recesses are defined in each section of amorphous material 67 for receiving both ends of the glass transponder in which the antenna coil 68 is provided. Again, the magnetic field from the antenna coil 68 in the glass transponder is guided through the air gap between the two sections of amorphous material 67. This means that when the tag is in use, a read/write unit is able to get very close to the field associated with the antenna coil 68, which therefore makes it easier to obtain reliable information form the tag. This embodiment is particularly advantageous, since conventional glass transponders are cheap and easily available. Furthermore, the performance and robustness of the RFID transponder is substantially increased.

Furthermore, the RFID tag of this embodiment is easier to manufacture, since it is not required to wind the antenna coil around a core.

In the embodiments shown in FIGS. 3-5, the magnetic field extends through an air gap (i.e. a gap of material with high permeability) for a relatively long distance over the closed loop formed by the field lines. This improves the overall performance of the RFID tag, as the magnetic field in the air gap is used for read and write purposes. Furthermore, when the amorphous material is arranged relative to the coil as shown in the previous three embodiments, this enhances the effective Q of the antenna coil.

Although the present invention has been described with reference to specific embodiments, it is not limited to these embodiments and no doubt further alternatives will occur to the skilled person that lie within the scope of the invention as claimed. For example, although the present invention is basically described with respect to a possible usage for animal tagging; the invention can advantageously be applied for other applications e.g asset tracking or automotive.

What is claimed is:

1. An RFID tag, comprising:
  a transponder part having an antenna coil with an associated field forming a closed loop arranged therein; and
  a mounting part for fixing the tag in a mounted position and being engageable with the transponder part so as to be received in the transponder part when the tag is in the mounted position,
  wherein the tag further comprises an amorphous ferromagnetic material configured to be arranged on the mounting part proximal to a center of the antenna coil when the tag is in the mounted position for guiding the field over a section of the closed loop outside the antenna coil.

2. The RFID tag according to claim 1, wherein the amorphous ferromagnetic material is adapted to guide the field from a first direction to a second direction.

3. The RFID tag according to claim 1, wherein the first direction is a predetermined field direction.

4. The RFID tag according to claim 1, wherein the amorphous material has a triangular shape.

5. The RFID tag according to claim 1, wherein the amorphous material is arranged so as to be partially inside the coil when the tag is in the mounted position.

6. The RFID tag according to claim 1, wherein the amorphous material is provided in the mounting part such that it extends in both a first and a second direction.

7. The RFID tag according to claim 1, wherein the mounting part comprises a needle having a tip provided at an end that is received in the transponder part in the mounted position and the tip is formed of the amorphous material.

8. The RFID tag according to claim 1, wherein the amorphous material has a relative magnetic permeability of between 2000 and 115000.

9. The RFID tag according to claim 1, wherein the transponder part is configured as a label for the tag.

10. An RFID tag, comprising:

a substantially triangular transponder part including an elongate glass transponder with an antenna coil arranged therein and having an associated field forming a closed loop;

a mounting part for fixing the tag in a mounted position and being engageable with the transponder part so as to be received in the transponder part when the tag is in the mounted position; and wherein the tag further comprises two pieces of non-overlapping amorphous ferromagnetic material each located at an end of the glass transponder for guiding the field over a section of the closed loop, an entirety of each of the pieces of amorphous material being coplanar and providing an air gap in the same plane of and between the two coplanar pieces of amorphous ferromagnetic material, a magnetic field of the antenna coil being guided through the air gap between the two pieces of coplanar amorphous ferromagnetic material.

11. An RFID tag comprising:

a transponder part having an antenna coil with an associated field forming a closed loop arranged therein;

a mounting part for fixing the tag in a mounted position and being engageable with the transponder part so as to be received in the transponder part when the tag is in the mounted position; and wherein the tag further comprises an amorphous ferromagnetic material configured to have a central portion receiving the antenna coil and comprising a first portion connected to one side of the central portion and a second portion connected to another side of the central portion to form an air gap for guiding the field over a section of the closed loop.

12. A method of manufacturing an RFID tag, the method comprising:

positioning an antenna coil in a transponder part, the antenna coil having an associated field forming a closed loop;

forming a mounting part for engagement with the transponder part in a mounted position; and providing an amorphous ferromagnetic magnetic material in the tag such that the amorphous material is arranged in the mounting part proximal to the center of the antenna coil when the tag is in the mounted position for guiding the field over a section of the closed loop.

* * * * *